US011326511B2

(12) United States Patent
Ishiki et al.

(10) Patent No.: US 11,326,511 B2
(45) Date of Patent: May 10, 2022

(54) SOUND INSULATION STRUCTURE FOR VEHICLE

(71) Applicant: HONDA MOTOR CO., LTD., Tokyo (JP)

(72) Inventors: Kazuya Ishiki, Wako (JP); Tomohiko Nozaki, Wako (JP); Kuniaki Nakajima, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 990 days.

(21) Appl. No.: 16/017,054

(22) Filed: Jun. 25, 2018

(65) Prior Publication Data

US 2019/0017435 A1 Jan. 17, 2019

(30) Foreign Application Priority Data

Jul. 14, 2017 (JP) .............................. JP2017-137648

(51) Int. Cl.
*F02B 77/13* (2006.01)
*B60R 13/08* (2006.01)

(52) U.S. Cl.
CPC .......... *F02B 77/13* (2013.01); *B60R 13/0838* (2013.01); *B60R 2013/0807* (2013.01)

(58) Field of Classification Search
CPC ................ F02B 77/13; B60R 13/0838; B60R 2013/0807; B60R 13/0884
See application file for complete search history.

(56) References Cited

U.S. PATENT DOCUMENTS

2008/0093186 A1 4/2008 Imai et al.

FOREIGN PATENT DOCUMENTS

| CN | 205823446 U |   | 12/2016 |
|----|-------------|---|---------|
| JP | H07248774 A |   | 9/1995  |
| JP | 2000329192 A |  | 11/2000 |
| JP | 2001098954 A |  | 4/2001  |
| JP | 2008106809 A |  | 5/2008  |
| JP | 2009236091 A |  | 10/2009 |
| JP | 2011064194 A |  | 3/2011  |
| JP | 2013167191 A | * | 8/2013  |
| JP | 2013167191 A |  | 8/2013  |
| JP | 2014040830 A | * | 3/2014  |

(Continued)

OTHER PUBLICATIONS

China Office Action for CN Application No. 201810756371.0, dated Apr. 15, 2020, 13 pages.

(Continued)

*Primary Examiner* — Jacob M Amick
*Assistant Examiner* — Charles J Brauch
(74) *Attorney, Agent, or Firm* — Armstrong Teasdale LLP (57) ABSTRACT

A sound insulation structure includes a sound insulation cover (21-25) provided on a noise radiating member (7, 11) of the vehicle, the sound insulation cover being provided with a mounting opening (29), a spacer (30) received in the mounting opening of the sound insulation cover and provided with a central through hole (30A), and a fastening member (28, 67, 68) having a shank passed through the central through hole of the spacer and configured to fasten the sound insulation cover to the noise radiating member via the spacer. The spacer prevents the axial pressure of the fastening member from being applied to the sound insulation cover.

11 Claims, 11 Drawing Sheets

(56) References Cited

FOREIGN PATENT DOCUMENTS

| | | | |
|---|---|---|---|
| JP | 2014040830 A | | 3/2014 |
| JP | 2014095314 A | | 5/2014 |
| JP | 2016121639 A | * | 7/2016 |
| JP | 2016121639 A | | 7/2016 |
| WO | 2014034179 A1 | | 3/2014 |

OTHER PUBLICATIONS

JPO Office Action for JP Patent Application No. 2017-137648 dated Jan. 12, 2021; 10 pp.

* cited by examiner

SOUND INSULATION STRUCTURE FOR VEHICLE

TECHNICAL FIELD

The present invention relates to a sound insulation structure for a vehicle using a sound insulation cover configured to be placed on a noise radiating member of a vehicle.

BACKGROUND ART

It is known to place a cover on an outer surface of an internal combustion engine of a vehicle to minimize propagation of noises from the engine. See JP2009-236091A, for instance. The sound insulation structure disclosed in this patent document uses a sound insulation cover formed by pressing a sheet including a sound absorbing or sound insulation layer between a pair of skin members. The sound insulation cover is provided with a plurality of mounting openings arranged along an outer periphery thereof to receive mounting bolts that fixedly attach the sound insulation cover to a noise radiating member of the engine, such as the oil pan of the engine.

SUMMARY OF THE INVENTION

In the sound insulation structure disclosed in JP2009-236091A, the sound insulation cover is directly interposed between the oil pan and the head of the fastening bolt. Therefore, the fastening bolt is required to be fastened with a prescribed fastening torque so that the clamping axial force may be accurately controlled. Furthermore, if the fastening bolt is repeated fastened and unfastened, typically, for serving purposes, the peripheral edge of the mounting opening of the sound insulation cover may be damaged to such an extent, the fastening bolt becomes unable to securely fix the sound insulation cover onto the oil pan, and a part of the sound insulation cover may dangle from the engine.

In view of such a problem of the prior art, a primary object of the present invention is to provide a sound insulation structure that allows a sound insulation cover to be securely attached to a sound radiating part of a vehicle in a reliable manner.

A second object of the present invention is to provide a sound insulation structure that allows a sound insulation cover to be repeatedly attached to and detached from a sound radiating part of a vehicle without being damaged.

To achieve such an object, the present invention provides a sound insulation structure for a vehicle, comprising: a sound insulation cover (21-25) provided on a noise radiating member (7, 11) of the vehicle, the sound insulation cover being provided with a mounting opening (29); a spacer (30) received in the mounting opening of the sound insulation cover and provided with a central through hole (30A); and a fastening member (28, 67, 68) having a shank passed through the central through hole of the spacer and configured to fasten the sound insulation cover to the noise radiating member via the spacer, wherein the spacer includes a first member (31) having an inner tubular portion (33) defining the central through hole and received in the mounting opening, and a first flange (34) extending radially outward from an axial end of the inner tubular portion, and a second member (32) having an outer tubular portion (35) snugly receiving the inner tubular portion therein and received in the mounting opening, and a second flange (36) extending radially outward from an axial end of the outer tubular portion facing away from the axial end of the inner tubular portion, the inner tubular portion and the outer tubular portion being integrally joined to each other with the sound insulation cover interposed between mutually opposing surfaces (34A, 36A) of the first flange and the second flange.

Since the sound insulation cover is interposed between the first flange and the second flange of the spacer, and the spacer is fastened to the noise radiating member by the fastening member, the sound insulation cover is prevented from being damaged by the axial pressure of the fastening member. Therefore, even after repeated removals and attachments of the sound insulation cover, the sound insulation cover is not damaged, and is not required to be replaced. Furthermore, the use of the fastening member facilitates the attachment and removal of the sound insulation cover.

Preferably, a free end of the outer tubular portion abuts an opposing surface of the first flange.

Thereby, the axial force of the fastener can be supported by the spacer in a reliable manner.

Preferably, a free end of the inner tubular portion is crimped onto an inner peripheral part of the second member.

Thereby, the first member and the second member can be firmly joined to each other at a low cost.

Preferably, the mutually opposing surfaces (34A, 36A) of the first flange and the second flange are finished as smooth surfaces.

Thereby, the spacer is enabled to rotate relatively freely with respect to the sound insulation cover so that even when the spacer is caused to rotate during the process of fastening the fastening member, the sound insulation cover is prevented from being twisted or otherwise subjected to destructive forces during the fastening process.

Preferably, the noise radiating member is provided with an outwardly projecting boss (27), and the fastening member is fastened to a free end of the boss.

Thereby, the sound insulation cover is spaced from the noise radiating member so that the sound insulation cover is protected from the adverse effects of the heat transmitted from the noise radiating member. Also, the boss may be used for forming a female thread hole so that a simple threaded bolt may be used for securing the sound insulation cover to the noise radiating member without requiring an internal projection or other thick-walled portion in the noise radiating member.

According to a preferred embodiment of the present invention, the fastening member comprises a threaded bolt (28) having a head (28A), the shank being a threaded part (26B) of the threaded bolt, and the spacer is interposed between the noise radiating member and the head of the threaded bolt.

Thereby, the sound insulation cover can be attached to the noise radiating member both economically and easily.

In an alternate embodiment, the fastening member comprises a threaded stud bolt (67) integrally projecting from the noise radiating member, the shank being a threaded part of the threaded stud bolt, and the spacer is interposed between the noise radiating member and a nut (68) threaded onto the shank.

This also allows the sound insulation cover to be attached to the noise radiating member both economically and easily, and eliminates the need to form an internal projection or other thick-walled portion in the noise radiating member for forming a female threaded hole.

In a preferred embodiment of the present invention, the noise radiating member comprises an oil pan (7) of an internal combustion engine.

By strategically selecting the position and the size of the sound insulation cover, the noises from the oil pan can be minimized without excessively preventing the dissipation of heat from the surface of the oil pan.

In such a case, if an oil drain hole (42) is provided in a part of the oil pan adjacent to an edge of the sound insulation cover, a rib (43) separating the edge of the sound insulation cover from the oil drain hole may project from the oil pan.

Thereby, the oil that may drip from the oil drain hole is blocked by the rib so that the oil is prevented from contaminating the sound insulation cover. Also, the rib increases the stiffness of the oil pan, and contributes to the reduction of radiation of noises from the oil pan.

In another embodiment of the present invention, the noise radiating member comprises a chain case (11) of an internal combustion engine.

Since the noises from the timing chain are significant, the placing of the sound insulation cover on the chain cover is highly effective in reducing the overall noises from the engine.

In such a case, if a pulley (12) such as a crank pulley is provided on an end of a shaft projecting from a lower part of the chain case, a protrusion (44) may project from a part of the chain case adjoining the pulley so as to engage a lower edge of the sound insulation cover adjoining the pulley.

Thereby, the creep or other deformation of the sound insulation cover is prevented from causing an edge of the sound insulation cover to come into contact with the pulley.

The deformation of the sound insulation cover is controlled in an even more effective manner if a free end of the protrusion is bent upward so as to restrain a deformation of the sound insulation cover directed away from the chain case.

In a preferred embodiment of the present invention, an annular part (72) of the sound insulation cover surrounding the mounting opening is formed by a metallic mesh member, and is joined to a remaining part (71) of the sound insulation cover via an annular joint member (73).

Thereby, the vibration transmitted from the noise radiating member via the fastening member is favorable attenuated by the metallic mesh member so that the radiation of noises from the noise radiating member can be controlled in an even more favorable manner. Also, the metallic mesh member is highly heat resistant, and insulates the transmission of heat from the noise radiating member to the sound insulation cover so that the sound insulation cover can be protected from the adverse effects of the heat from the noise radiating member.

To establish an effective and convenient connection between the annular portion and the remaining part of the sound insulation cover, the annular joint member may be provided with an internal annular groove (74) receiving an outer peripheral edge of the annular part of the sound insulation cover, and an outer annular groove (75) receiving an inner peripheral edge of the remaining part of the sound insulation cover.

Thus, the present invention provides a sound insulation structure that allows a sound insulation cover to be securely attached to a sound radiating part of a vehicle in a reliable manner, and allows a sound insulation cover to be repeatedly attached to and detached from a sound radiating part of a vehicle without being damaged.

DESCRIPTION OF THE PREFERRED EMBODIMENT(S)

Preferred embodiments of the present invention are described in the following with reference to the appended drawings.

First Embodiment

Figure 1:
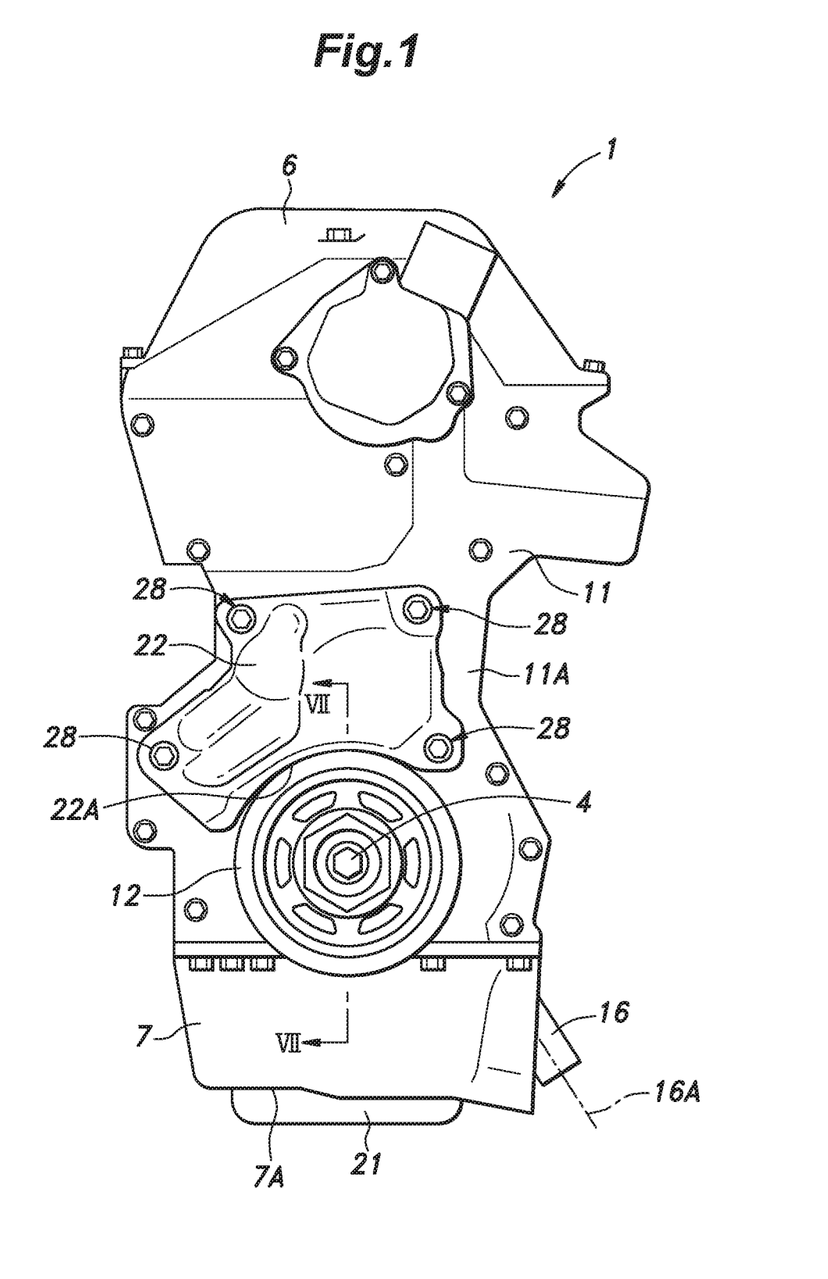
FIG. 1 is a side view of an internal combustion engine incorporated with a sound insulation structure according to a first embodiment of the present invention.
Figure 2:
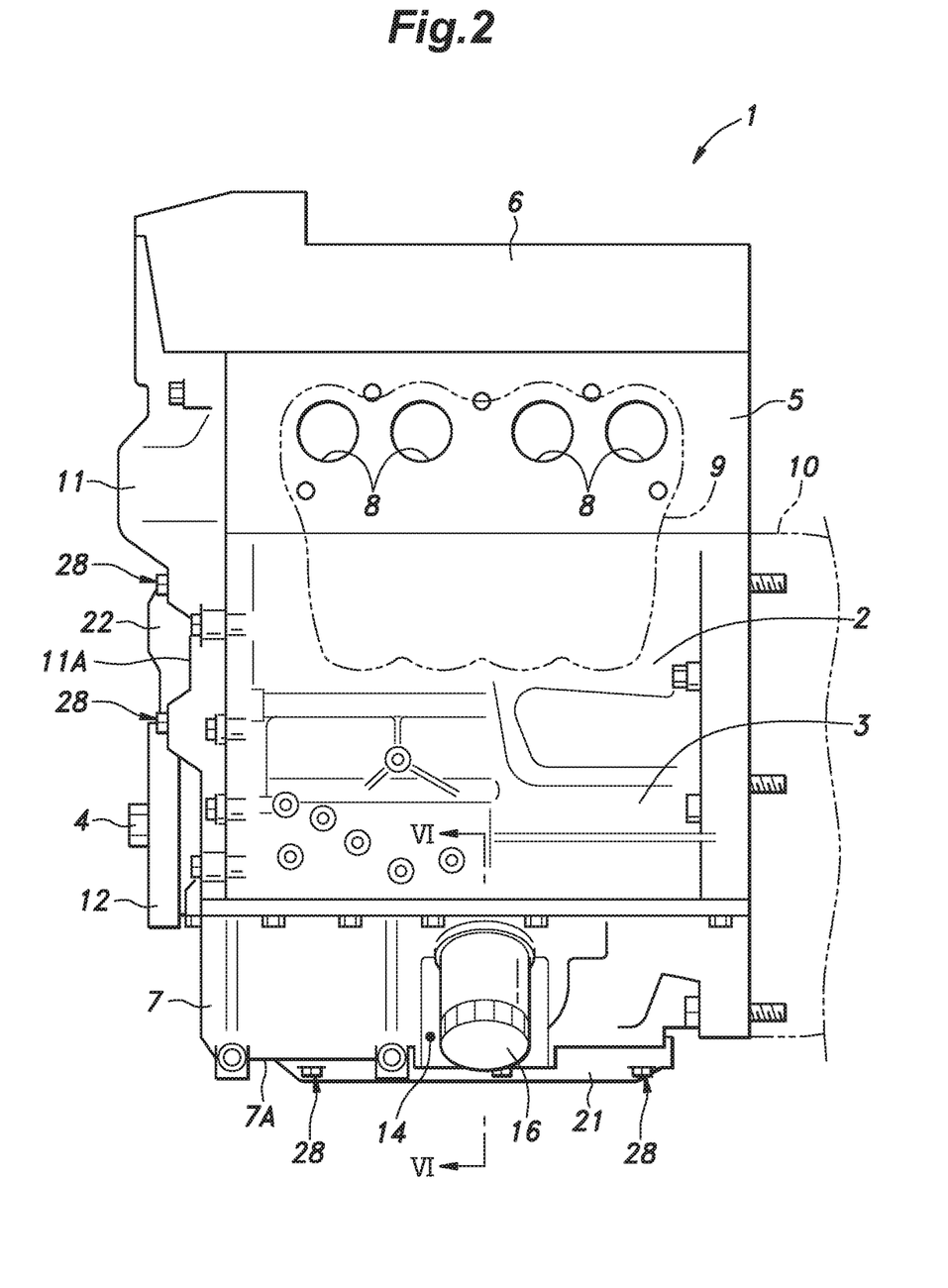
FIG. 2 is a front view of the engine.

A first embodiment of the present invention is described in the following with reference to FIGS. 1 to 8. FIG. 1 is a side view of an internal combustion engine 1 to which a sound insulation structure according to the first embodiment of the present invention is applied, and FIG. 2 is a front view of the internal combustion engine 1. As shown in FIG. 1 and FIG. 2, the internal combustion engine 1 consists of an in-line, four-cylinder engine using gasoline as a fuel, and has a cylinder block 2 defining four cylinders arranged in a single row. A crankcase 3 defining a crank chamber is integrally connected to the lower end of the cylinder block 2. The crankcase 3 is internally provided with a crankshaft 4 extending in a cylinder row direction. A cylinder head 5 is connected to the upper end of the cylinder block 2, and a head cover 6 is connected to the upper end of the cylinder head 5. A valve actuating chamber is defined jointly by the cylinder head 5 and the head cover 6. An oil pan 7 is connected to the lower end of the cylinder block 2 to jointly define a crank chamber and an oil reservoir.

The internal combustion engine 1 is installed in an engine room of a motor vehicle V in such a manner that the crankshaft 4 extends laterally, and the intake side of the engine 1 faces forward. Four intake ports 8 open out at the front side or the intake side of the cylinder head 5, and four exhaust ports (not shown in the drawings) open out at the rear side or the exhaust side of the cylinder head 5. An intake manifold 9 is connected to the front side of the cylinder head 5, and an exhaust manifold is connected to the rear side of the cylinder head 5. A transmission 10 is attached to the left side of the cylinder block 2 to transmit the output torque of the crankshaft to the wheels of the vehicle V. A chain case 11 is attached to the right side of the cylinder block 2 and the cylinder head 5. The chain case 11 is provided with a relatively low profile in a lower part thereof facing the cylinder block 2, and a relatively high profile part thereof facing the cylinder head 5. In other words, the upper part of the chain case 11 is provided with a bulging part bulging away from the engine 1.

The crankshaft 4 is passed through the right wall of the cylinder block 2 and the chain case 11, and the end of the crankshaft 4 projecting from the chain case 11 is fitted with a crank pulley 12. The crank pulley 12 is configured to rotate integrally with the crankshaft 4, and drives auxiliary devices via a serpentine belt. A crank sprocket is fixedly attached to a part of the crankshaft 4 located in the chain case 11. The crank sprocket drives a valve actuating mechanism provided in the valve actuating chamber via a timing chain (not shown in the drawings).

Figure 3:
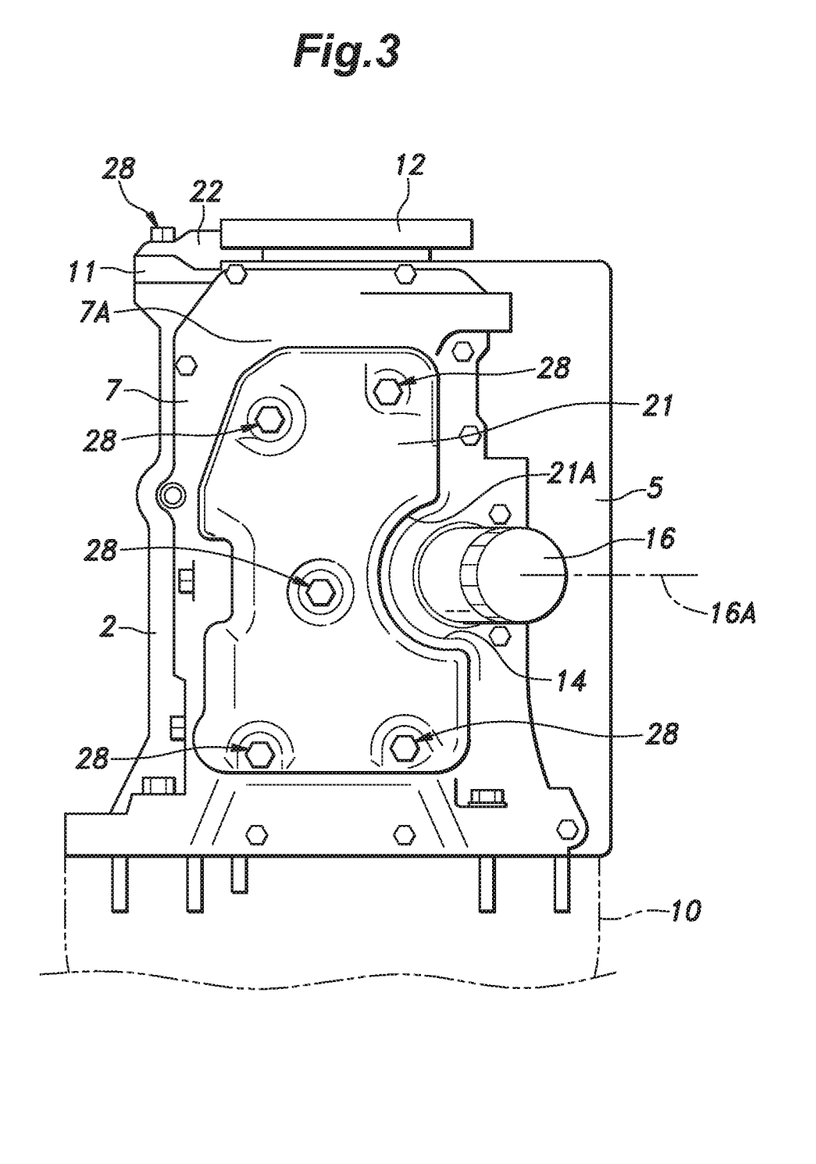
FIG. 3 is a bottom view of the engine.

FIG. 3 is a bottom view of the internal combustion engine 1. As shown in FIG. 3 also, a recess 14 is formed in a laterally middle part of the front side of the oil pan 7, and an oil filter 16 is provided so as to be partly accommodated therein. The oil filter 16 has a cylindrical shape, and is detachably fitted into an opening of the oil pan 7 with an axial line 16A thereof directed in a forward and downward direction.

The cylinder block 2, the cylinder head 5, the head cover 6, the oil pan 7 and the chain case 11 are made by die-casting an aluminum alloy.

The lower surface 7A of the oil pan 7 and the right side surface 11A (or the main outer surface) of the chain case 11 are defined by substantially planar wall parts so that such wall parts inevitably vibrate and emit noises by being excited by the vibrations caused by moving parts of the engine 1 such as the crankshaft 4 and the timing chain. Therefore, sound insulation covers 21 and 22 are attached to the lower surface 7A of the oil pan 7 and the right side surface 11A of the chain case 11, respectively.

The sound insulation covers 21 and 22 are made of a soft material made of viscoelastic elastomers and/or porous materials such as foams, fibers and fabrics. In the illustrated embodiment, the sound insulation covers 21 and 22 are formed by interposing resin impregnated fiber board between a pair of non-woven fabric sheets. The sound insulation covers 21 and 22 are effective in reducing sound propagation from the surfaces of the oil pan 7 and the chain case 11, thereby reducing the noises radiated into the air from the oil pan 7 and the chain case 11.

The sound insulation cover 21 attached to the lower surface 7A of the oil pan 7 is formed in a rectangular shape corresponding to the shape of the planar lower surface 7A of the oil pan 7, and has a semicircular arcuate cutout 21A corresponding to the recess 14 at the front edge thereof. The sound insulation cover 21 is fixed to the oil pan 7 by threaded bolts 28 provided at five locations, four arranged along the periphery thereof, and one at a central part thereof, and covers substantially the entire area of the flat lower surface 7A of the oil pan 7.

The sound insulation cover 22 attached to the right side surface 11A of the chain case 11 is provided with an arcuate cutout 22A corresponding to the crank pulley 12 at its lower edge, and extends over a lower part of the chain case 11. Thus, the chain case 11 extends over a substantially entire part of the right side surface 11A of the chain case 11 excluding the area that interferes with the crank pulley 12 and the area corresponding to the bulging upper part of the chain case 11.

Figure 4:
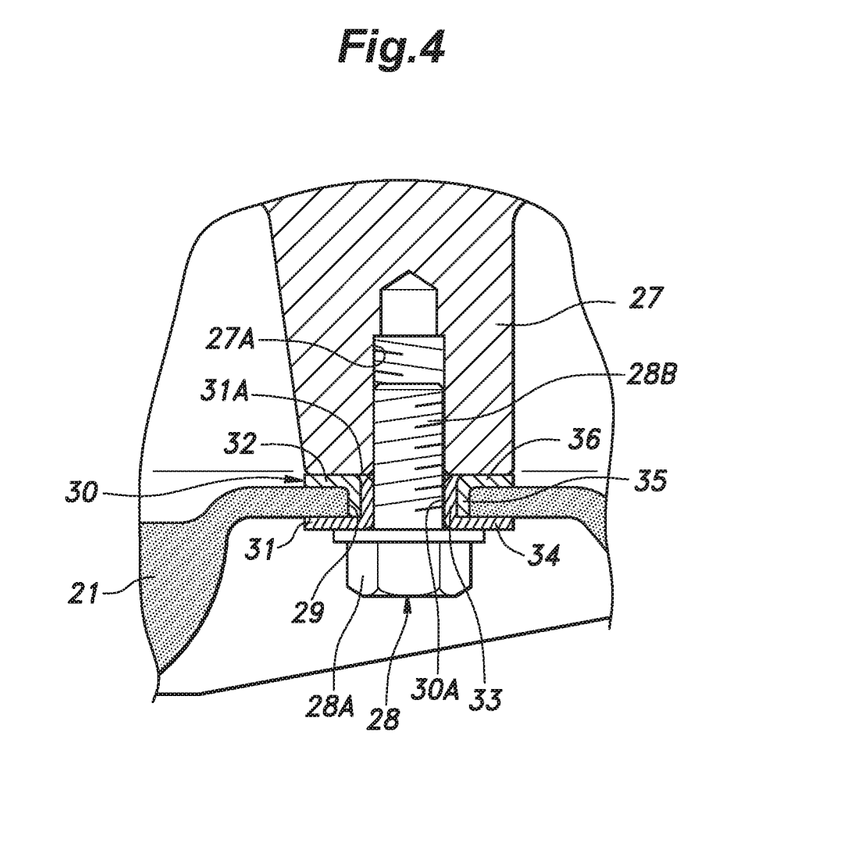
FIG. 4 is a fragmentary sectional view taken along line IV-IV of FIG. 3.

Next, the modes of securing the sound insulation covers 21 and 22 to the corresponding parts of the engine main body are described in the following. FIG. 4 is a fragmentary sectional view taken along line IV-IV of FIG. 3. The lower surface 7A of the oil pan 7 is provided with five mounting bosses 27 projecting downward and each having a planar free end (lower end). One of the mounting bosses 27 is shown in FIG. 4. A female thread hole 27A is formed in the planar free end of the boss 27. The sound insulation cover 21 is provided with openings 29, and the part of the sound insulation cover 21 surrounding each opening 29 is provided with a reduced thickness as compared to the remaining part of the sound insulation cover 21. A spacer 30 is fitted on the periphery of the opening 29, and a shank 28B of the threaded bolt 28 is passed into a central through hole 30A of the spacer 30, and is threaded into the female thread hole 27A of the mounting boss 27. Thus, the sound insulation cover 21 is firmly clamped between a head 28A of the threaded bolt 28 threaded into the female thread hole 27A and the free end surface of the boss 27 via the spacer 30.

The spacer 30 includes a first member 31 and a second member 32. The first member 31 includes an inner tubular portion 33 defining the central through hole 30A of the spacer 30 extending in an axial direction, and dimensioned so as to snugly receive the shank 28B of the threaded bolt 28, and a first flange 34 extending radially outward from a lower end of the inner tubular portion 33 (a distal end with respect to the lower surface 7A of the oil pan 7), all in a coaxial relationship. The second member 32 includes an outer tubular portion 35 defining a central through hole extending in an axial direction, and dimensioned so as to snugly receive the inner tubular portion 33 of the first member 31, and a second flange 36 extending radially outward from an upper end (a proximal end with respect to the lower surface 7A of the oil pan 7), all in a coaxial relationship.

The inner tubular portion 33 of the first member 31 is received in the central through hole of the outer tubular portion 35 of the second member 32 as mentioned above, and the free end of the inner tubular portion 33 abuts the opposing surface of the first flange 34. The first member 31 and the second member 32 are crimped or otherwise firmly joined to each other so that the sound insulation cover 21 is clamped between the first flange 34 and the second flange 36 in a slightly compressed state. The projecting length of the inner tubular portion 33 from the first flange 34 is substantially equal to or slightly greater than the overall length of the second member 32 (the sum of the length of the outer tubular portion 35 and the thickness of the second flange 36).

The first member 31 and the second member 32 are each formed into the shape including the tubular portion and the flange by blanking steel plate and drawing the blanked steel plate. The drawn work is then coated with a layer of material which is heat and corrosion resistant such as Geomet (trademark). The surfaces of the first member 31 and the second member 32 are finished smoothly. In particular, the opposing surfaces 34A and 36A of the first flange 34 and the second flange 36 are smoothly finished. As discussed earlier, the inner tubular portion 33 is fitted into the outer tubular portion 35, and are securely joined to each other with the sound insulation cover 21 interposed between the opposing surfaces 34A and 36A of the first flange 34 and the second flange 36.

There are a number of possible ways to join the first member 31 and the second member 32 to each other such as welding (such as laser welding and spot welding), brazing and adhesive bonding. In the illustrated embodiment, the two members are joined to each other by crimping as described in the following.

Figure 5A:
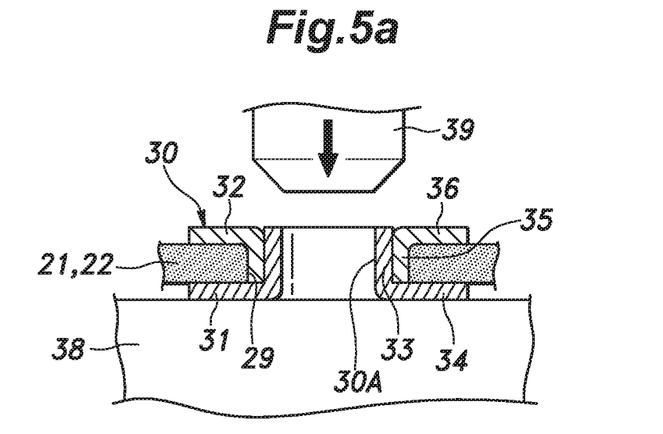
FIGS. 5a and 5b are sectional views illustrating the process of fabricating a spacer shown in FIG. 4.
Figure 5B:
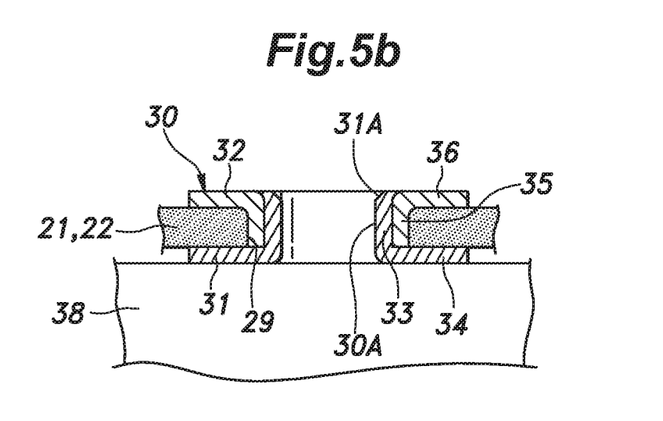

FIGS. 5a and 5b are sectional views illustrating the process of fabricating the spacer 30 shown in FIG. 4. In FIG. 5a, the inner tubular portion 33 is inserted into the outer tubular portion 35 with the sound insulation cover 21 interposed between the first flange 34 and the second flange 36. The spacer assembly is placed on a base 38 or an anvil. A punch 39 having a tapered free end is coaxially arranged with the spacer assembly, and pushed onto the free end of the inner tubular portion 33 of the first member 31. The tip end of the punch 39 has a smaller diameter than the inner diameter of the inner tubular portion 33, and an axially adjoining part (a base end part) of the punch 39 has a larger diameter than the inner diameter of the inner tubular portion 33.

Therefore, when the punch 39 is pushed onto the free end of the inner tubular portion 33 of the first member 31, the free end of the inner tubular portion 33 is caused to undergo an elastic deformation so as to radially expand, and to be crimped onto the inner periphery of the second flange 36 (or the inner periphery of the outer tubular portion 35) as shown in FIG. 5b. The first member 31 and the second member 32 are therefore firmly joined to each other owing to a crimped portion 31A formed in the free end of the inner tubular portion 33, and the sound insulation covers 21 and 22 are slightly compressed between the first flange 34 and the second flange 36 of the spacer 30.

The thickness of the sound insulation cover 21 in relation to the axial length of the outer tubular portion 35 is determined so that the static frictional torque between the sound insulation cover 21 and the spacer 30 is smaller than the static frictional torque between spacer 30 and the opposing surface of the oil pan 7 when the threaded bolt 28 is fastened into the female thread hole 27A with a prescribed fastening torque.

Figure 6:
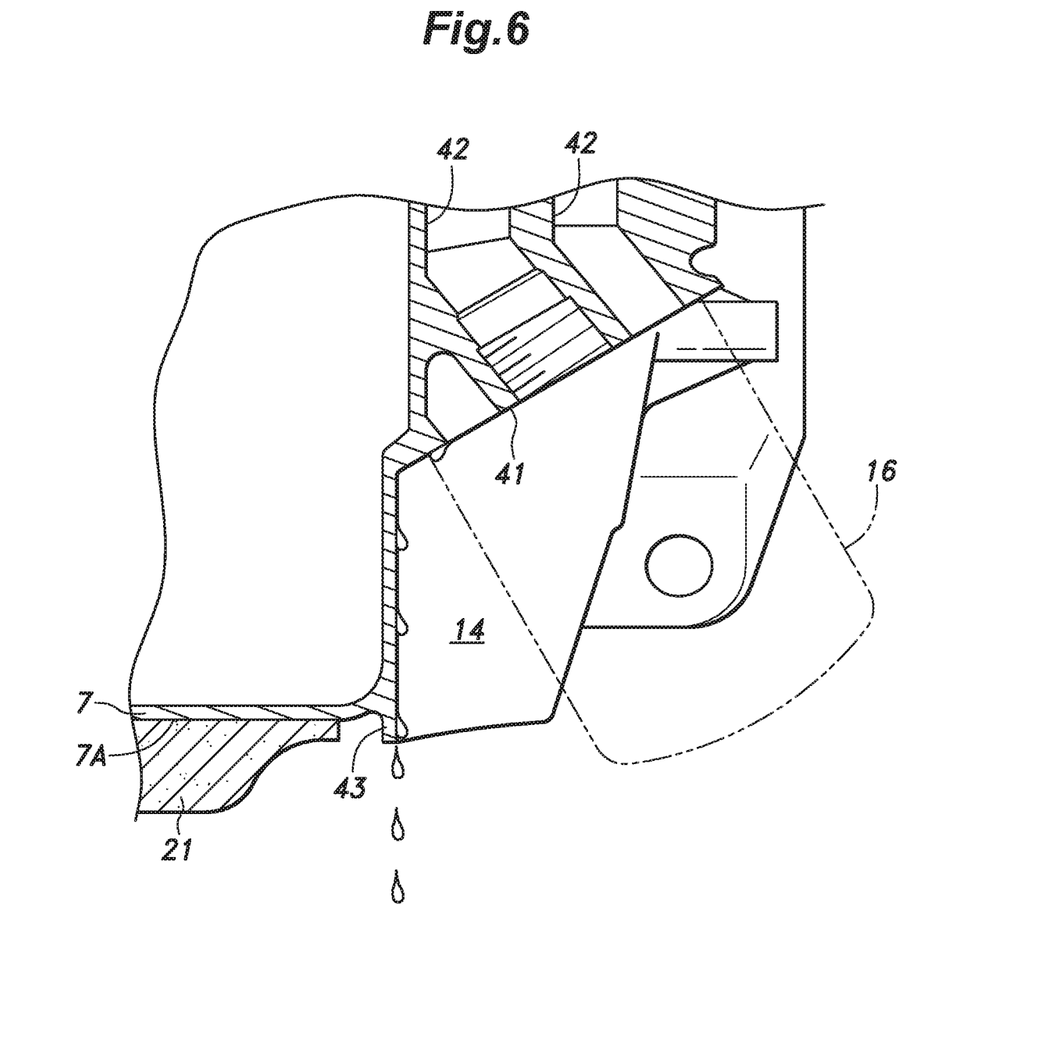
FIG. 6 is a fragmentary sectional view taken along line VI-VI of FIG. 2.

FIG. 6 is a cross-sectional view taken along the line VI-VI in FIG. 2. As shown in FIG. 6, in an upper part of the recess 14 of the oil pan 7, a planar mounting seat 41 that faces in a forwardly and downwardly oblique direction is formed in order to attach the oil filter 16 thereto. Two oil passages for the oil flowing into and out of the oil filter 16 open out in the mounting seat 41. The oil filter 16 can be removed by unscrewing the oil filter 16. At such a time, some oil inevitably drips from the oil passages, and adheres to and flows along the vertical wall of the recess 14. In this regard, these oil passages 42 may be regarded as oil drain holes 42. In such a situation, it is desirable to prevent the contamination of the sound insulation cover 21 with such oil. For this purpose a rib 43 projects downward from a boundary region of the oil pan 7 so as to separate the sound insulation cover 21 from the recess 14. In this case, the rib 43 defines an extension of the vertical wall of the recess 14 so that the oil adhering to the wall of the recess 14 flows along the surface of the vertical wall of the recess 14, and drips downward from the lower edge of the recess 14 so that the oil is prevented from reaching the sound insulation cover 21 which is located on the other side of the rib 43.

Figure 7:
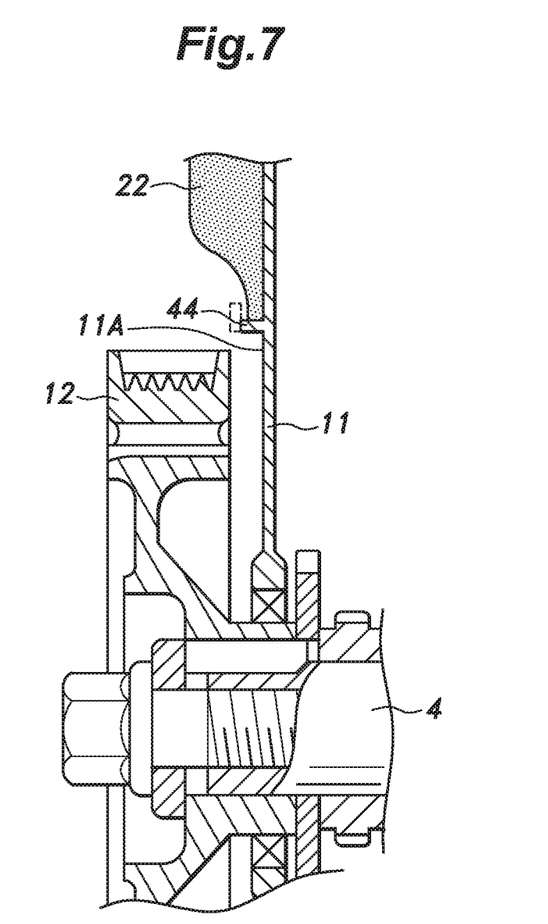
FIG. 7 is a fragmentary sectional view taken along line VII-VII of FIG. 1.

FIG. 7 is a sectional view taken along the line VII-VII of FIG. 1. As described above, the sound insulation cover 22 is placed on the chain case 11 so as not to overlap with the crank pulley 12. However, some creeping (deformation) of the sound insulation cover 22 inevitably occurs over time due to the heat received from the chain case 11 and the air circulating in the engine room, and external forces such as the gravitational force and the vibrations transmitted from the chain case 11. Therefore, it is necessary to ensure that the sound insulation cover 22 does not come into contact with the crank pulley 12 under any circumstances. In the illustrated embodiment, a protrusion 44 integrally projects rightward (outward) from the right side surface 11A of the chain case 11. The protrusion 44 may be formed so as to be bent and project upward at the distal end thereof as indicated by imaginary line lines in FIG. 7. By forming the protrusion 44 in this way, not only the downward displacement of the sound insulation cover 22 but also the rightward deflection of the lower edge of the sound insulation cover 22 away from the surface of the chain case 11 can be prevented so that the sound insulation cover 22 is prevented from coming into contact with the crank pulley 12 under any circumstances.

Figure 8:
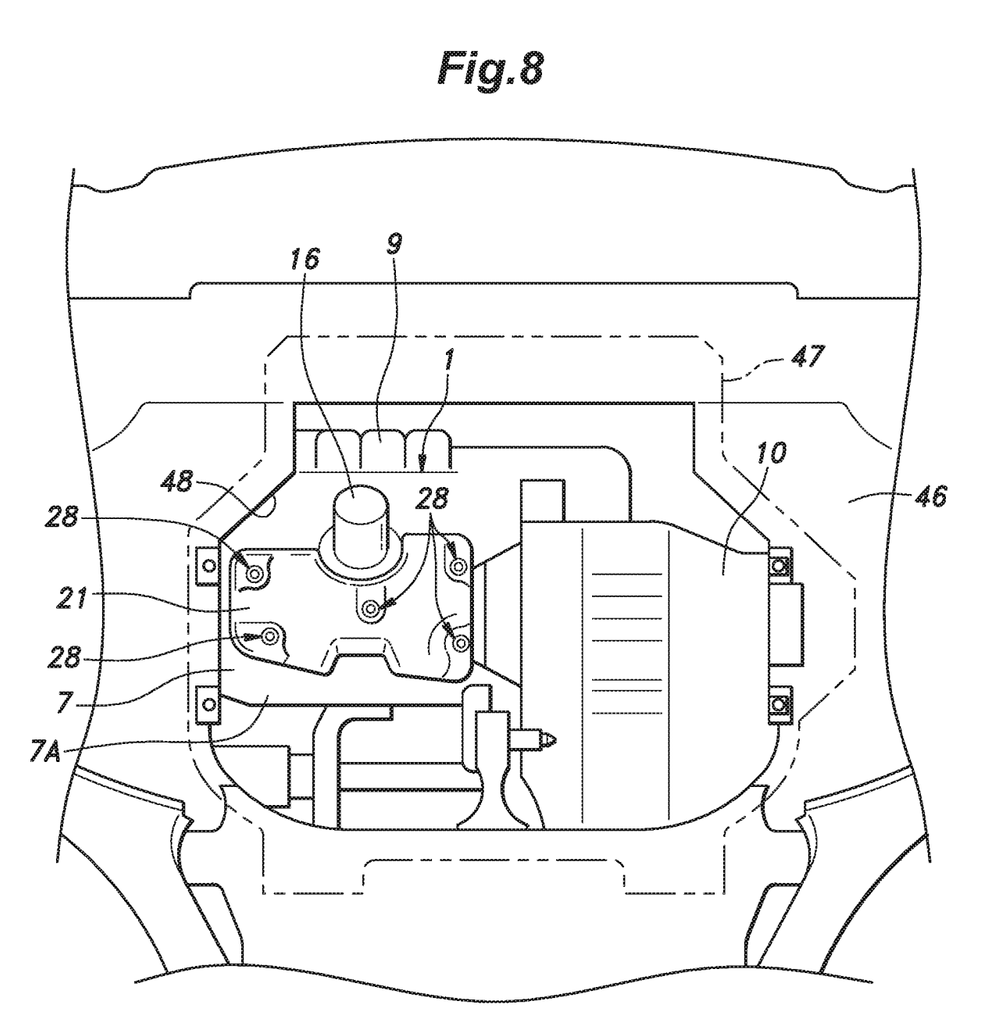
FIG. 8 is a bottom view of a front part of a vehicle to which the engine shown in 1 is mounted.

FIG. 8 is a bottom view of a front part of the vehicle to which the engine shown FIG. 1 is mounted. As shown in FIG. 8, the engine 1 is mounted in an engine room with the oil filter 16 facing forward. An engine room under cover 46 is provided in a lower part of the engine room. The under cover 46 is provided with an opening 48 for maintenance purposes which is normally closed by a detachable lid 47 indicated by an imaginary line in FIG. 8. The opening 48 is positioned and dimensioned so that the sound insulation cover 21 attached to the oil pan 7 and the oil filter 16 may be accessible from under the engine room via the opening 48. Thus, the oil filter 16 and the sound insulation cover 21 can be attached and detached from to and from the engine from under the engine room.

The function and advantages of the sound insulation structure of the vehicle V configured as described above are discussed in the following. As shown in FIG. 4, the spacers 30 provided on the sound insulation covers 21 and 22 each include the first member 31 having the inner tubular portion 33 and the first flange 34, and the second member 32 having the outer tubular portion 35 and the second flange 36, and the two members 31 and 32 are integrally joined to each other with the free end of the outer tubular portion 35 abutting the first flange 34. Further, the thickness of the sound insulation cover 20 or 21 is greater than the length of the outer tubular portion 35.

Therefore, the sound insulation cover 21 or 22 is interposed and compressed between the first flange 34 and the second flange 36 of the spacer 30. Therefore, the spacer 30 is firmly retained to the sound insulation cover 21 or 22 so that movement between the spacer 30 and the sound insulation cover 21 or 22 is prevented, and the possibility of undesired wear or undesired noises can be minimized. Also, when securing the sound insulation cover 21 or 22 to the oil pan 7 or the chain case 11 via the spacers 30 by using threaded bolts 28, the sound insulation cover 21 or 22 is prevented from being excessively compressed or otherwise damaged by the fastening of the threaded bolts 28. Therefore, even if the sound insulation cover 21 or 22 is repeatedly attached and detached, the sound insulation cover 21 and 22 can be kept attached to the oil pan 7 or the chain case 11 in a reliable manner. Further, since the sound insulation cover 21 or 22 is fixed to the oil pan 7 or the chain case 11 by the threaded bolts 28, the work of attaching and detaching the sound insulation cover 21 or 22 is facilitated.

Since the opposing surfaces 34A and 36A of the first flange 34 and the second flange 36 are finished into smooth surfaces, the sound insulation covers 21 and 22 can readily slide with respect to the first flange 34 and the second flange 36. Therefore, even when the spacer 30 rotates together with the threaded bolt 28 at the time of tightening the threaded bolt 28, the sound insulation cover 21 or 22 is prevented from being twisted.

The inner tubular portion 33 has an axial length substantially equal to or slightly greater than the axial length of the outer tubular portion 35 so that the inner tubular portion 33 may be crimped radially outward at the free end thereof onto the inner periphery of the second member 32 or the free end part of the inner tubular portion 33 as shown in FIG. 5b. Therefore, the two member can be firmly joined to each other. Alternatively, the inner tubular portion 33 and the outer tubular portion 35 may be joined to each other by using other modes of joining such as welding (such as laser welding and spot welding), brazing and adhesive bonding.

As shown in FIGS. 1 and 3, the sound insulation covers 21 and 22 may be applied locally to the chain case 11 and the oil pan 7 of the internal combustion engine 1. Therefore, by appropriately determining the area to be covered by the sound insulation cover, the radiation of sound can be effectively minimized without causing an excessive rise in the temperature of the lubricating oil of the engine owing to thermal insulation.

As shown in FIG. 6, the oil drain holes 42 are provided in a part of the oil pan 7 adjacent to an edge of the sound insulation cover 21, and a rib 43 separating the edge of the sound insulation cover 21 from the oil drain holes 42 projects from the oil pan 7. The rib 43 extends at least along the boundary between the oil filter 16 and the sound insulation cover 21. As a result, the oil that may flow down along the side surface of the oil pan 7 from the oil drain holes 42 is prevented from flowing along the lower surface 7A of the oil pan 7 where the sound insulation cover 21 is placed. Therefore, at the time of changing the oil filter 16, the oil is prevented from contacting the sound insulation cover 21 provided on the lower surface 7A of the oil pan 7. In addition, since the stiffness of the oil pan 7 is improved by the rib 43 so that the vibration of the oil pan 7 is suppressed, and radiation of noises from the oil pan 7 can be minimized.

The soft sound insulation cover 22 may creep due to heat and gravity over time. Therefore, as shown in FIG. 7, the sound insulation cover 22 covering a part of the right side surface 11A located above the crank pulley 12 may shift downwards toward the crank pulley 12 as shown in FIG. 7. However, according to the illustrated embodiment, the protrusion 44 projecting from the right side surface 11A of the chain case 11 engages the sound insulation cover 22 so as to prohibit downward movement thereof so that the sound insulation cover 22 is prevented from coming into contact with the crank pulley 12. The protrusion 44 may consist of a rib extending along the circumference of the crank pulley 12 in an arcuate manner or linearly in a tangential direction. Alternatively, the protrusion 44 may also consist of one or more discrete projections. In either case, the free end of the protrusion may be bent over the outer surface of the sound insulation cover 22 so that the peeling or other movement of the sound insulation cover 22 away from the surface of the chain case 11 may also be prevented.

Second Embodiment

A second embodiment of the present invention is described in the following with reference to FIG. 9. In this embodiment, the parts corresponding to those of the first embodiment are denoted with like numerals without necessarily repeating the description such parts.

Figure 9:
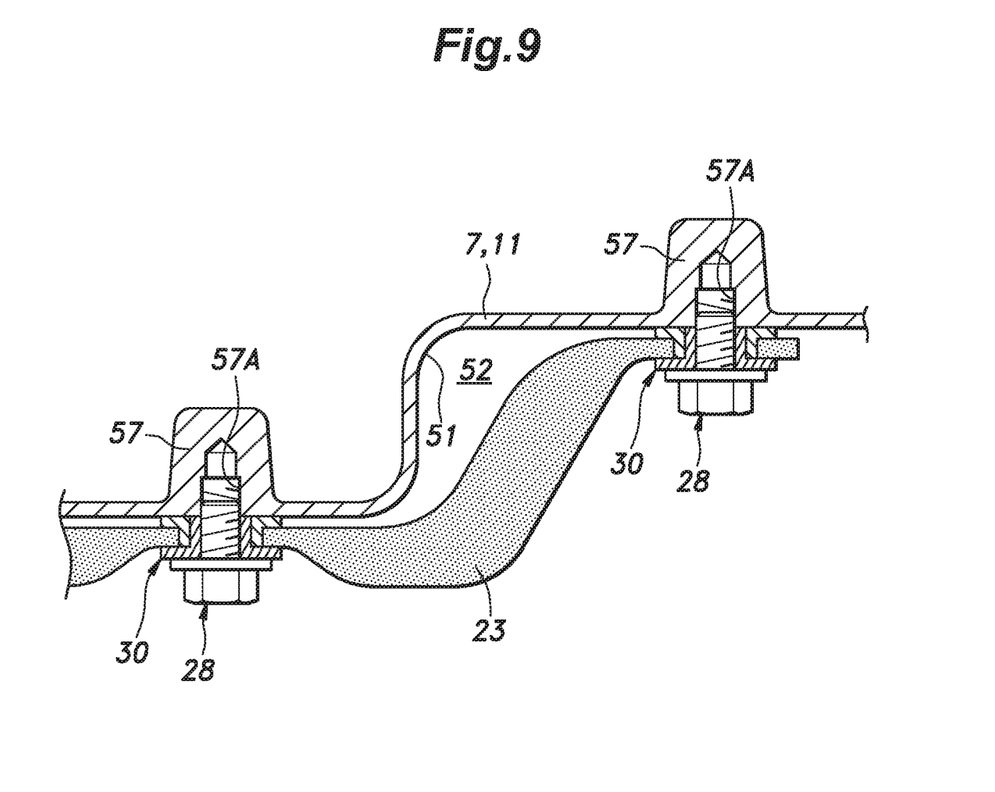
FIG. 9 is a fragmentary sectional view showing a sound insulation structure according to a second embodiment of the present invention.

FIG. 9 is a cross-sectional view of a main part of the sound insulation structure according to the second embodiment of the present invention. As shown in FIG. 9, in the vehicle sound insulation structure of the present embodiment, a die-cast wall member such as an oil pan 7 and a chain case 11 is provided with a bend 51 as seen in cross section, and defines a recess 52 facing outward at the bend 51. In this case, a pair of bends are formed between two wall parts that are parallel to each other in a mutually offset relationship. The two wall parts are each provided with a boss 57 projecting inward, and a female thread hole 57A is formed in the outer end of each boss 57.

The sound insulation cover 23 is shaped so as to substantially conform to the outer contour of the die-cast wall member 7 or 11. The sound insulation cover 23 is provided with a plurality of mounting openings and are each fitted with a spacer 30 similar to that of the first embodiment. A threaded bolt 28 is passed into each through hole 30A of the spacer 30, and threaded into the corresponding female thread hole 57A with the result that the sound insulation cover 23 is secured to the die-cast wall member 7 or 11 by clamping the spacer 30 between the head of the threaded bolt 28 and the opposing surface of the die-cast wall member 7 or 11.

The casting die is used for die-casting the die-cast wall member 7 or 11, and the recess 52 is formed by a protruding part of the casting die. Such a protruding part of the casting die tends to wear faster than other parts of the casing die owing to a relatively severe thermal and mechanical loading. As a result, the configuration of the recess 52 inevitably changes as the use time of the casting die increases. Therefore, after the casting die is used for a prolonged period of time, a large gap may be defined between the sound insulation cover 23 and the opposing surface of the die-cast wall member 7 or 11 in the area adjoining the recess 52 in a more pronounced way than in the remaining part of the opposing surface of the die-cast wall member 7 or 11. This does not create any significant problem because the presence of the bend 51 defining the recess 52 increases the stiffness of this part of the die-cast wall member 7 or 11, and this part radiates noises less actively than the remaining part of the die-cast wall member 7 or 11. Also, the creation of bends in the sound insulation cover 23 for conforming to the surface contour of the die-cast wall member 7 or 11 increases the stiffness of the sound insulation cover 23 so that the sound insulation cover 23 can be firmly secured to the die-cast wall member 7 or 11 even when the points of attachment to the die-cast wall member 7 or 11 is limited.

Third Embodiment

Figure 10:
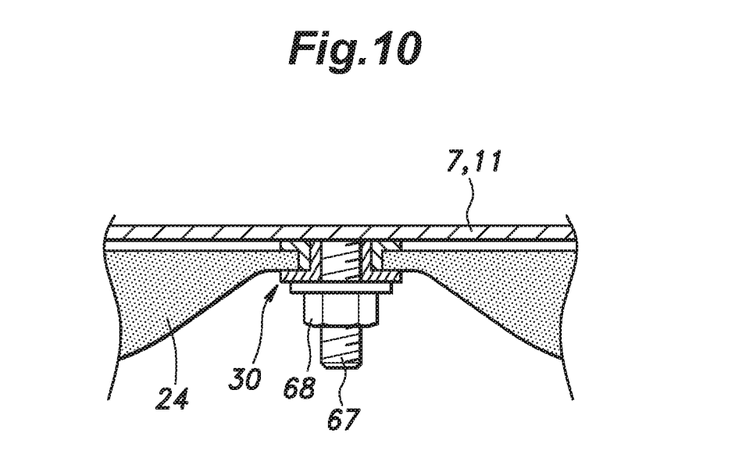
FIG. 10 is a fragmentary sectional view showing a sound insulation structure according to a third embodiment of the present invention.

A third embodiment of the present invention is described in the following with reference to FIG. 10. In this embodiment, the parts corresponding to those of the first embodiment are denoted with like numerals without necessarily repeating the description such parts. FIG. 10 is a cross sectional view of a main part of a sound insulation structure according to the third embodiment. As shown in FIG. 10, in this embodiment, a stud bolt 67 is implanted on the outer surface of the noise radiating member such as an oil pan 7 and a chain case 11. The shank of the stud bolt 67 is passed through the through hole 30A of the spacer 30, and a nut 68 is threaded onto the stud bolt 67 so that the sound insulation cover 24 is attached to the noise radiating member 7, 11 via the spacer 30 which is clamped between the outer surface of the noise radiating member and the nut 68.

In the sound insulation structure of this embodiment, the sound insulation cover 24 can be provided close to the noise radiating member 7, 11, and the noise radiating member is not required to have a boss for forming a female thread hole.

Fourth Embodiment

A fourth embodiment of the present invention is described in the following with reference to FIG. 11. In this embodiment, the parts corresponding to those of the first embodiment are denoted with like numerals without necessarily repeating the description such parts.

Figure 11:
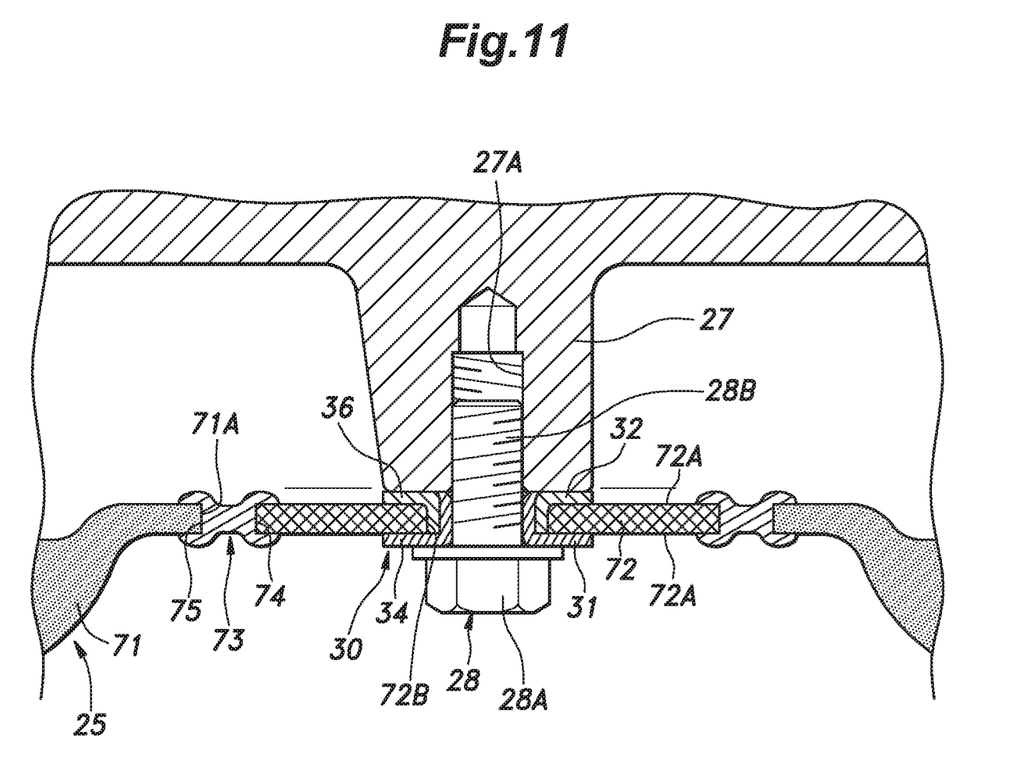
FIG. 11 is a fragmentary sectional view showing a sound insulation structure according to a fourth embodiment of the present invention.

FIG. 11 is a cross sectional view of a main part of a sound insulation structure according to the fourth embodiment. As shown in FIG. 11, a sound insulation cover 25 of the present embodiment includes a cover main body 71 having an opening 71A (which is circular in this embodiment) larger than the first flange 34 and the second flange 36 of the spacer 30, and an annular plate-like mesh member 72 made of metal and placed in the opening 71A of the main body 71. A spacer 30 similar to that of the first embodiment is fitted into a central opening 72B (mounting opening) of the annular plate-like mesh member 72. The annular plate-like mesh member 72 and the main body 71 are joined to each other via an annular joint member 73 having an annular inner peripheral groove 74 facing radially inward and an annular outer peripheral groove 75 facing radially outward. The inner peripheral edge of the main body 71 defining the opening 71A is fitted into the annular outer peripheral groove 75, and the outer peripheral edge of the annular plate-like mesh member 72 is fitted into the annular inner peripheral groove 74. The annular joint member 73 thus joins the plate-like mesh member 72 and the main body 71 to each other optionally with the aid of a bonding agent.

In the fourth embodiment of the present embodiment, the vibration transmitted from the noise radiating member such as the oil pan 7 and the chain case 11 to the sound insulation cover 25 is initially absorbed by the annular plate-like mesh member 72 so that the vibration transmitted from the noise radiating member is attenuated before reaching the cover main body 71 of the sound insulation cover 25. Since the annular plate-like mesh member 72 is highly heat resistant so that the conduction of heat from the noise radiating member to the sound insulation cover 25 is minimized, and the durability of the sound insulation cover 25 can be enhanced.

Although the present invention has been described in terms of specific embodiments, such embodiments should not be construed as limiting the present invention in any war, and various parts of the present invention can be omitted and/or substituted without departing from the scope of the present invention. For example, in the above-described embodiment, the noise radiating member consisted provided in the oil pan 7 and the chain case 11, but may consist of other parts of the internal combustion engine 1, such as the head cover 6 and the crankcase 3, or any other part of the internal combustion engine 1. In case of an electric vehicle, the noise radiating member may consist of a casing of a motor or a gear mechanism or any other parts of the vehicle from which noises can be radiated.

The invention claimed is:

1. A sound insulation structure for a vehicle, comprising:
a sound insulation cover provided on a noise radiating member of the vehicle, the sound insulation cover being provided with a mounting opening;
a spacer received in the mounting opening of the sound insulation cover and provided with a central through hole; and
a fastening member having a shank passed through the central through hole of the spacer and configured to fasten the sound insulation cover to the noise radiating member via the spacer,
wherein the spacer includes a first member having an inner tubular portion defining the central through hole and received in the mounting opening, and a first flange extending radially outward from an axial end of the inner tubular portion, and a second member having an outer tubular portion snugly receiving the inner tubular portion therein and received in the mounting opening, and a second flange extending radially outward from an axial end of the outer tubular portion facing away from the axial end of the inner tubular portion, the inner tubular portion and the outer tubular portion being integrally joined to each other with the sound insulation cover interposed between mutually opposing surfaces of the first flange and the second flange,
wherein the noise radiating member comprises an oil pan of an internal combustion engine, and
wherein an oil drain hole is provided in a part of the oil pan adjacent to an edge of the sound insulation cover, and a rib separating the edge of the sound insulation cover from the oil drain hole projects from the oil pan.

2. The sound insulation structure as defined in claim 1, wherein a free end of the outer tubular portion abuts an opposing surface of the first flange.

3. The sound insulation structure as defined in claim 2, wherein a free end of the inner tubular portion is crimped onto an inner peripheral part of the second member.

4. The sound insulation structure as defined in claim 1, wherein the mutually opposing surfaces of the first flange and the second flange are finished as smooth surfaces.

5. The sound insulation structure as defined in claim 1, wherein the noise radiating member is provided with an outwardly projecting boss, and the fastening member is fastened to a free end of the boss.

6. The sound insulation structure as defined in claim 1, wherein the fastening member comprises a threaded bolt having a head, the shank being a threaded part of the threaded bolt, and the spacer is interposed between the noise radiating member and the head of the threaded bolt.

7. The sound insulation structure as defined in claim 1, wherein the fastening member comprises a threaded stud bolt integrally projecting from the noise radiating member, the shank being a threaded part of the threaded stud bolt, and the spacer is interposed between the noise radiating member and a nut threaded onto the shank.

8. A sound insulation structure for a vehicle, comprising:
a sound insulation cover provided on a noise radiating member of the vehicle, the sound insulation cover being provided with a mounting opening;
a spacer received in the mounting opening of the sound insulation cover and provided with a central through hole; and
a fastening member having a shank passed through the central through hole of the spacer and configured to fasten the sound insulation cover to the noise radiating member via the spacer,
wherein the spacer includes a first member having an inner tubular portion defining the central through hole and received in the mounting opening, and a first flange extending radially outward from an axial end of the inner tubular portion, and a second member having an outer tubular portion snugly receiving the inner tubular portion therein and received in the mounting opening, and a second flange extending radially outward from an axial end of the outer tubular portion facing away from the axial end of the inner tubular portion, the inner tubular portion and the outer tubular portion being integrally joined to each other with the sound insulation cover interposed between mutually opposing surfaces of the first flange and the second flange,
wherein the noise radiating member comprises a chain case of an internal combustion engine, and
wherein a pulley is provided on an end of a shaft projecting from a lower part of the chain case, and a protrusion projects from a part of the chain case adjoining the pulley so as to engage a lower edge of the sound insulation cover adjoining the pulley.

9. The sound insulation structure as defined in claim 8, wherein a free end of the protrusion is bent upward so as to restrain a deformation of the sound insulation cover directed away from the chain case.

10. A sound insulation structure for a vehicle, comprising:
a sound insulation cover provided on a noise radiating member of the vehicle, the sound insulation cover being provided with a mounting opening;
a spacer received in the mounting opening of the sound insulation cover and provided with a central through hole; and
a fastening member having a shank passed through the central through hole of the spacer and configured to fasten the sound insulation cover to the noise radiating member via the spacer,
wherein the spacer includes a first member having an inner tubular portion defining the central through hole and received in the mounting opening, and a first flange extending radially outward from an axial end of the inner tubular portion, and a second member having an outer tubular portion snugly receiving the inner tubular portion therein and received in the mounting opening, and a second flange extending radially outward from an axial end of the outer tubular portion facing away from the axial end of the inner tubular portion, the inner tubular portion and the outer tubular portion being integrally joined to each other with the sound insulation cover interposed between mutually opposing surfaces of the first flange and the second flange, and
wherein an annular part of the sound insulation cover surrounding the mounting opening is formed by a metallic mesh member, and is joined to a remaining part of the sound insulation cover via an annular joint member.

11. The sound insulation structure as defined in claim 10, wherein the annular joint member is provided with an internal annular groove receiving an outer peripheral edge of the annular part of the sound insulation cover, and an outer annular groove receiving an inner peripheral edge of the remaining part of the sound insulation cover.

* * * * *